United States Patent Office 3,306,876
Patented Feb. 28, 1967

3,306,876
HEAT-FUSIBLE POLYBENZOXAZOLES
Simon W. Kantor and Joseph Sonnenberg, Schenectady, N.Y., assignors to General Electric Company, a corporation of New York
No Drawing. Filed Feb. 9, 1965, Ser. No. 431,465
5 Claims. (Cl. 260—47)

This invention is concerned with a process for making polybenzoxazoles, and polymers obtained in accordance with this process. More particularly, the invention relates to a process for making a polybenzoxazole composed of recurring units of the formula I
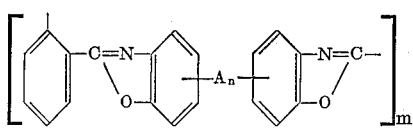

which process comprises effecting reaction between a diamino compound of the formula II
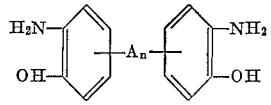

and phthalic anhydride, advantageously, though not necessarily in the presence of a solvent, where A is a member selected from the class consisting of

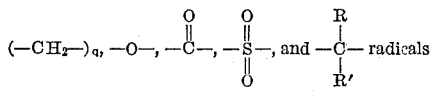

R and R' are monovalent hydrocarbon radicals, $m$ is a whole number in excess of 30, e.g., up to 10,000 or more and advantageously from 100 to 5,000, $n$ is a whole number from 0 to 1, and $q$ is a whole number equal to from 1 to 8; inclusive, and the carbon-to-carbon bonds or valence bonds of A are para to either of the oxygen and nitrogen atoms, whether in the diamino compound of Formula II or the final polybenzoxazole of Formula I. When $n$ is zero, the bond between the two adjoining phenyl radicals should not be ortho to either the nitrogen or oxygen (i.e., the benzoxazole forming ring substituents).

In our copending application Ser. No. 431,402, filed concurrently herewith and assigned to the same assignee as the present invention, we discolse and claim polyamides composed of recurring units of the formula III
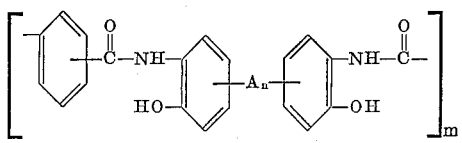

where A, $m$, and $n$ have the meanings given above, and the carbon-to-carbon bonds of A are para to either of the amino and hydroxyl groups. In the aforesaid copending application, these polyamides are prepared from the reaction of isophthaloyl or terephthaloyl chloride and an aminobiphenyl compound containing a nuclearly substituted hydroxy group on each aryl nucleus, in the presence of a hydrohalide acceptor. The polyamide resins thus obtained are then converted to polybenzoxazoles composed of recurring units of the formula IV
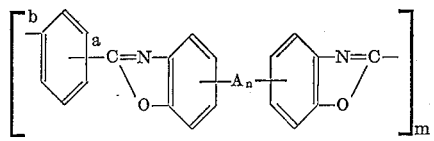

where A, $m$, and $n$ have the meanings for Formula III, and bond $a$ is meta or para to $b$, by heating the polyamide at temperatures of from about 200 to 350° C. for a time sufficient to effect formation of the oxazole ring.

We have now unexpectedly discovered that contrary to the method described in our copending application for making polybenzoxazoles where it is first necessary to proceed to the hydroxy polyamide state when using the abovementioned phthaloyl halides, we are able to make polybenzoxazole by an entirely different route using phthalic anhydride for reaction with the diamino compound of Formula II. We have further found that one aspect of our invention enables us to effect direct reaction of phthalic anhydride with the diamino compound at temperatures as low as room temperature, advantageously in the presence of a solvent for the reactants, while dispensing with the necessity of using a hydrohalide acceptor. The generally involves the use of low boiling solvents and the isolation of a reaction product which has the formula V
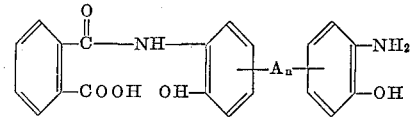

where A and $n$ have the meanings above. This latter compound can then be heated at about 250–350° C., advantaegously in the absence of oxygen, to effect formation of the polybenzoxazole of Formula I.

Another method whereby our invention can be practiced using the above reactants involves forming a solution of the phthalic anhydride and the diamino compound of Formula II in a solvent such as cresol or phenol, heating the reactants at the reflux temperature of the mass, for instance, at about 180–210° C., to obtain a low molecular weight polymer derived from the above compound of Formula V, isolating this low molecular weight polymer by first removing the solvent, and thereafter heating the polymer again at about 250–350° C. to obtain the polybenzoxazole.

Finally, one can also react phthalic anhydride and the diamino compound of Formula II, by first dissolving the reactants in a composition which is a solvent for the reactants only at elevated temperatures, for instance, o-phenylphenol, m-terphenyl, etc., heating the mixture at the reflux temperature of the mass, for instance, about 250–350° C., to obtain directly the polybenzoxazole with the simultaneous evolution of water.

The fact that we were able to effect reaction between the diamino compound and an orthophthalic acid derivative such as phthalic anhydride to obtain ultimately high molecular weight polymers was entirely unexpected and no way could have been predicted since when attempts were made to obtain a polybenzoxazoles from the aforesaid diamino compound and ortho-phthaloyl halides, only very low molecular weight polymers were obtained, with the concurrent formation of cyclic imide structures which hindered further the formation of higher molecular weight products.

By means of our invention, we are able, if we so desire, to reduce the processing necessary to obtain the polybenzoxazoles composed of recurring units of Formula I to a one-step process, and to obtain an essentially pure product. By avoiding the necessity of using any phthaloyl halides with the concommitant release of hydrogen halide, additional processing costs are avoided in removing the hydrogen halide.

Among the diamino compounds which may be employed in the practice of the present invention may be mentioned, for instance, 3,3'-dihydroxy benzidine; 3,4'-diamino-3',4-dihydroxybiphenyl; 3.3'-dihydroxy-4,4' - diamino diphenyloxide; 3,3'-dihydroxy-4,4'-diamino diphenylsulfone; 2,2 - bis(3 - amino-4-hydroxyphenyl)propane; bis(3-hydroxy-4-aminophenyl)methane; 3,3'-dihydroxy-4,4'-diamino benzophenone: 1,1-bis(3-hydroxy-4-aminophenyl)ethane; 1,3-bis(3-hydroxy-4-aminophenyl)propane; 2,2 - bis(3-hydroxy-4-aminophenyl)propane having the formula

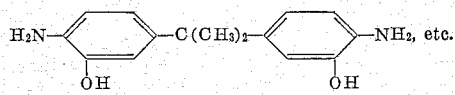

It will of course be apparent to those skilled in the art that other diamino compounds may be employed especially where $n$ and $q$ in formula II are varied. In the above compounds R and R' may be the same or different monovalent hydrocarbon radicals, for instance, aliphatic (including saturated and unsaturated aliphatic radicals), aryl, aralkyl and alkaryl radicals; specific examples of which are methyl, ethyl, propyl, butyl, vinyl, allyl, methallyl, styryl, cyclohexyl, allyphenyl, phenyl, benzyl, xylyl, tolyl, etc. The presence of olefinic unsaturated radicals imparts additional functionality to the polybenzoxazole through the vinyl unsaturation. The presence of inert substituents on the phthalic anhydride, e.g., from 1 to 4 halogens, such as chlorine, is not precluded.

In preparing these polybenzoxazoles, solvents in which the aforesaid two reactants are both soluble (either at room temperature or at elevated temperatures) and in which the polymer is soluble, are advantageously employed. Among such solvents may be mentioned, for instance, phenol, cresol, o-phenylphenol, m-terphenyl, N,N-dimethyl acetamide, N-methyl-2-pyrrolidone, N,N-dimethyl formamide, etc. The temperature at which these solvents can be used will depend on the liquid temperature of the solvents.

Generally, the diamino compound and the phthalic anhydride should be reacted in essentially equimolar concentrations. A 5% molar excess of either of the reactants is not precluded, especially when making lower molecular weight products.

The reaction between the diamino compound and the phthalic anhydride is ordinarily carried out at a temperature from about 0° to about 200° C. or higher. As pointed out above, under some conditions of reaction, excessively higher temperatures are often unnecessary, since reaction can take place at room temperature (about 25 to 30° C.). Subsequent heating at elevated temperatures produces the polybenzoxazole.

The polybenzoxazoles of the present invention have the unusual properties, as contrasted to the properties of insolubility and infusibility of most polybenzoxazoles formed from isophthaloyl or terephthaloyl halides, of being fusible and soluble in many organic solvents. The polybenzoxazoles of Formula I have good strength at both normal and elevated temperatures and are quite flexible at room temperature. Because these polymers are fusible and soluble, they can be extruded or dissolved in suitable solvents and used for coating or other protective applications. Films and fibers formed from such polybenzoxazoles can be extruded or cast from solution and can then be oriented to increase their strength.

In addition, the polybenzoxazoles composed of units of Formula I find use as heat resistant coatings for various surfaces and as insulation for conductors. Because of the high melting point of these polybenzoxazoles (about 300° C. or above) and because of their outstanding resistance to hydrolysis and weather, these polybenzoxazoles are admirably suitable as slot liners in motors. Films of the polybenzoxazoles can be used in wrapping and enclosing applications where resistance to elevated temperatures and moisture is a requirement. Fibers made from the polybenzoxazoles can be employed to make cloth and fabrics exhibiting good heat-resistance.

Polybenzoxazoles of the present invention can be obtained in intrinsic viscosities $[\eta]$ at 25° C. in cresol or concentrated (i.e., about 98%) sulfuric acid ranging from about 0.1 to 3.5 or higher. The molecular weights of these polymers (when measured, for example, by osmotic pressure techniques or by light scattering) can range from about 5,000 to well in excess of 500,000 or more.

In order that those skilled in the art may better understand how the present invention may be practiced, the following examples are given by way of illustration and not by way of limitation. Unless otherwise stated, all parts are by weight. Where analyses are given, the values in parentheses are the theoretical values.

PREPARATION OF 3,3'-DIHYDROXYBENZIDINE

The compound 3,3'-dihydroxybenzidine was prepared by the reaction of 3,3'-dimethoxy benzidine with 57% hydriodic acid following the directions of Burkhardt and Wood in J. Chem. Soc., 151 (1929). U.S. 2,497,248 also shows the preparation of this compound. The crude product was recrystallized from a dimethyl acetamide-water mixture, followed by washing with ethyl alcohol, and drying. The purified product was identified as 3,3'-dihydroxybenzidine.

PREPARATION OF 3,3'-DIAMINO-4,4'-DIHYDROXYBIPHENYL

To 15 grams (0.08 mole) of 4,4'-dihydroxybiphenyl dissolved in 810 ml. of acetic acid at 70° C. was added dropwise 10.14 ml. (0.16 mole) of concentrated nitric acid. The color of the solution darkened to red and soon orange crystals began to appear. The mixture was heated at its boiling point for ½ hour at 118° C. and was filtered when cooled. The precipitate was collected, washed with acetic acid and dried to give 15.3 grams (melting point 284–285° C.) of the 3,3'-dinitro-4,4'-dihydroxybiphenyl. A solution of 5 grams of the above nitrated biphenyl in about 125 ml. pyridine was hydrogenated in a Paar Shaker using platinum oxide as catalyst at 120° C. Hydrogen uptake was rapid and essentially quantitative. The cooled pyridine solution was filtered, the pyridine removed, and the residue was boiled with ethanol to give the desired 3,3'-diamino-4,4'-dihydroxybiphenyl. This material was purified further by dissolving in dimethyl acetamide and treating with charcoal. Hot water was added to the filtrate to yield the above-described diamino compound melting point somewhat above 300° C. Analysis established the identity of this compound as evidenced by the fact that it contained C: 66.3%; (66.7%); H: 5.4% (5.6%); N: 12.8% (13.0%).

PREPARATION OF 2,2-BIS(3-AMINO-4-HYDROXYPHENYL)PROPANE

About 5 ml. (0.08 mole) concentrated nitric acid diluted with 1.6 ml. water and 15 ml. acetic acid were added at a temperature of 14–16° C. to 9.0 grams of 2,2-bis(4-hydroxyphenyl)propane (0.04 mole) dissolved in 60 ml. cold acetic acid. Thereafter, the mixture was stirred for ½ hour at around room temperature (25–28° C.). Upon cooling the mixture to below room temperature, a precipitate was obtained and this precipitate was washed and recrystallized from acetic acid to give 2,2-bis(3-nitro-4-hydroxyphenyl)propane, melting at 134.5–135.0° C. The identity of this compound was established by analysis which showed that it contained C: 56.5% (56.6%); H: 4.5% (4.4%); N: 8.6% (8.8%). A solution of 1.6 grams of this dinitro compound in 250 ml. absolute alcohol was hydrogenated at room temperature in a Paar Shaker using 0.1 gram of platinum oxide as the catalyst until a theoretical amount of hydrogen was absorbed. The ethanol solution was heated and the catalyst removed by filtration. Concentration of the ethanol solution yielded crystals having a melting point at 258–261° C. When recrystallized twice from absolute ethanol, a product was obtained which was identified to be the above-described diamino compound as evidenced by the analysis which showed C: 68.6% (69.7%); H: 7.1% (7.0%); N: 9.8% (10.9%).

PREPARATION OF 3,3'-DIAMINO-4,4'-DIHYDROXYDIPHENYLSULFONE

About 25 grams (0.10 mole) of 4,4'-dihydroxydiphenylsulfone suspended in 80 ml. of water was treated with 120 ml. of nitric acid. After heating on a steam bath for three hours, the yellow product was collected, washed in hot water and then boiled in a small quantity of ethanol. Upon recrystallization from ethanol the 3,3'-dinitro-4,4'-dihydroxydiphenyl sulfone was obtained melting between 238.5–240° C. A solution of 6.8 grams of the dinitro sulfone in 80 ml. of pyridine was hydrogenated in a Paar Shaker using platinum oxide as catalyst. Hydrogen was absorbed first at room temperature and then at 115° C. until 95 percent of the theoretical hydrogen was consumed. The pyridine solution was evaporated to dryness and the residue taken up in methanol and treated twice with charcoal after adding some water. Recrystallization from a methanol-water mixture gave the above-described 3,3' - diamino-4,4'-dihydroxydiphenyl sulfone melting at 238–238.5° C. Analysis of this compound established its identity as evidenced by the fact that it contained C: 50.7% (51.4%); H: 4.4% (4.3%); N: 9.5% (10.0%).

Example 1

A mixture of 4.32 grams (0.02 mole) of 3,3'-dihydroxybenzidine, 2.96 grams (0.02 mole) phthalic anhydride and 25 ml. of redistilled cresol was placed in a three-necked reaction vessel equipped with a nitrogen inlet, stirrer, thermometer and distilling head. The mixture was heated gradually to reflux temperature to obtain a clear solution at which time it was then heated at the reflux temperature of the mixture for 1 hour while removing approximately 2 ml. of distillate consisting of cresol and water. The remaining cresol was removed by distillation under vacuum and the residual resin was heated at 300° C. under 0.002 mm. Hg for 1½ hours to give a polymer, which even though it was heated to 300° C. for 1½ hours under vacuum was still soluble in hot cresol. This polymer was composed of recurring structural units of the formula VI 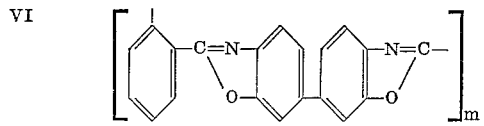

where $m$ is a whole number in excess of 30. The polymer had an intrinsic viscosity $[\eta]=0.44$ at 25° C. measured in concentrated $H_2SO_4$ and softened at 300° C.

A similar preparation was carried out in the same manner as described in Example 1 with the exception that 10 grams of phenol was used as solvent in place of the cresol. Again a solution of the polybenzoxazole of Formula VI was obtained.

Example 2

When phthalic anhydride is reacted with 3,3'-diamino-4,4'-dihydroxybiphenyl in the same proportions and in the same manner as recited in Example 1, a polybenzoxazole composed of recurring structural units of the formula VII 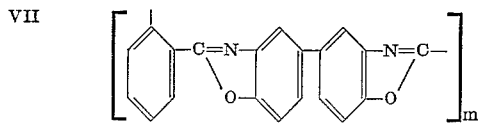

is obtained, where $m$ is a whole number in excess of 30.

Example 3

A mixture composed of equimolar concentrations of phthalic anhydride and 2,2'-bis(3-amino-4-hydroxyphenyl)-propane (prepared in the manner described above) dissolved in dimethyl acetamide is stirred at around room temperature for about 1 hour. When the solvent is removed and the residual resin treated in the same manner as in Example 1, a polymer is obtained composed of recurring units of the formula VIII 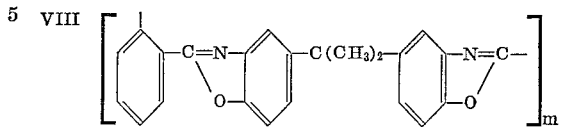

where $m$ is a whole number in excess of 30.

Example 4

When a solution in dimethyl acetamide of equal molar concentrations of phthalic anhydride and 3,3'-diamino-4,4'-dihydroxydiphenylsulfone (prepared as described above) is stirred at room temperature for about 1 hour, and the solution treated as in Example 1, a polymer is obtained which is composed of recurring structural units of the formula IX 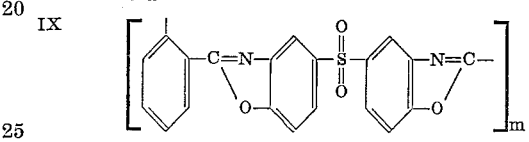

where $m$ is a whole number in excess of 30.

Example 5

A mixture of 2.16 grams (0.01 mole) of 3,3'-dihydroxybenzidine, 1.48 grams (0.01 mole) of phthalic anhydride and 20 grams of o-terphenyl were placed in a reaction vessel. Under a blanket of nitrogen and while the mixture was stirred, the mixture was heated gradually increasing the temperature over a ½ hour period to 330–332° C. to a point where the o-terphenyl refluxed. Water which began to form at about 130° C. was removed and gradually evolved during this heating period. The mixture was then refluxed for an additional 5½ hours. On cooling, the polymer precipitated at 220° C. The mixture was cooled to about 60° C. and 500 ml. of acetone was added to wash the polymer free of o-terphenyl. The polymer was filtered, washed with heated acetone, and dried to give essentially a theoretical yield of the polybenzoxazole of Formula VI.

When o-phenylphenol was substituted in place of the o-terphenyl and the mixture of ingredients heated at the reflux temperature of the mass (about 280° C.) in the same manner as was done in the above Example 5, and the polymer was isolated similarly as described therein, a polybenzoxazole composed of recurring structural units of Formula VI was again obtained.

Example 6

In this example, 2.16 grams of 3,3'-dihydroxybenzidine and 1.48 grams phthalic anhydride were dissolved in 25 ml. N-methyl-2-pyrrolidone. The mixture was stirred at room temperature (about 25–30° C.) for about ½ hour to give a product which corresponded to a composition having the formula

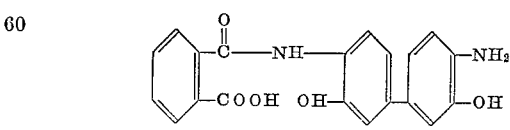

The solution was then mixed with water to precipitate the aforesaid composition. The compound obtained was heated at a temperature between 300–400° C. for one hour under nitrogen to obtain a cresol-soluble polymer composed of recurring structural units of Formula VI. Identification of the polymer as being composed of the aforesaid polybenzoxazole units was established by analysis which showed that the polymer contained 77.3% carbon, 3.2% hydrogen, and 9.1% nitrogen as contrasted to the theoretical values of 77.5% carbon, 3.2% hydrogen and 9.0% nitrogen.

It will of course be apparent to those skilled in the art that, in addition to the diamino compounds recited in the aforesaid examples, other diamino compounds coming within the scope of Formula II may be employed with the phthalic anhydride without departing from the scope of the invention. Other solvents may be employed and the conditions used to make the polymer may also be varied widely.

It will also be apparent that other modifying agents such as fillers (e.g., carbon black, silica, glass fibers, etc.), heat and light stabilizers, dyes and pigments may be incorporated in the polymers without departing from the scope of the invention. The aforesaid polybenzoxazoles may be combined with other resins, such as phenolic resins, urea-formaldehyde resins, malamine resins, polyimide resins, polyethylene terephthalate resins, etc. to give novel compositions of matter.

What we claim as new and desire to secure by Letters Patent of the United States is:

1. A heat-fusible, cresol-soluble composition of matter composed of recurring units of the structural formula

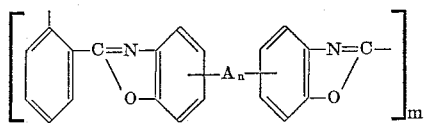

where A is a member selected from the class consisting of $(-CH_2-)_q$, $-O-$, $-\overset{O}{\underset{O}{\overset{\|}{S}}}-$, $-\overset{O}{\overset{\|}{C}}-$, and $-\overset{R}{\underset{R'}{\overset{|}{C}}}-$radicals R and R' are monovalent hydrocarbon radicals, $m$ is a whole number in excess of 30, $n$ is a whole number from 0 to 1, inclusive, and $q$ is a whole number equal to from 1 to 8, inclusive, and the bonds of A are para to either of the oxygen and nitrogen atoms.

2. A heat-fusible, cresol-soluble composition of matter composed of recurring structural units of the formula

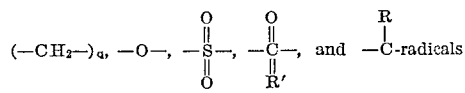

where $m$ is a whole number in excess of 30.

3. A heat-fusible, cresol-soluble composition of matter composed of recurring structural units of the formula

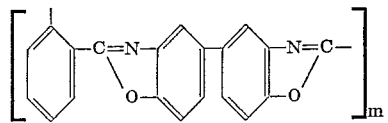

where $m$ is a whole number in excess of 30.

4. A heat-fusible, cresol-soluble composition of matter composed of recurring structural units of the formula

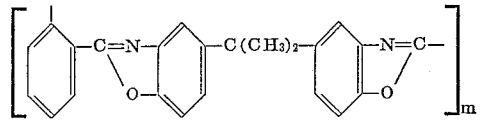

where $m$ is a whole number in excess of 30.

5. A heat-fusible, cresol-soluble composition of matter composed of recurring structural units of the formula

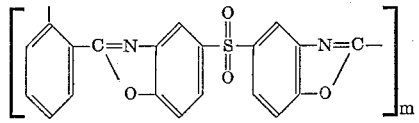

where $m$ is a whole number in excess of 30.

References Cited by the Examiner

UNITED STATES PATENTS

| | | | |
|---|---|---|---|
| 2,625,536 | 1/1953 | Kirby | 260—78 |
| 2,904,537 | 9/1959 | Brinker | 260—78 |
| 3,028,364 | 4/1962 | Conix | 260—47 |
| 3,230,196 | 1/1966 | Moyer | 260—47 |

WILLIAM H. SHORT, *Primary Examiner.*

LOUISE P. QUAST, *Examiner.*

J. C. MARTIN, M. GOLDSTEIN, *Assistant Examiners.*